United States Patent [19]

Jost

[11] Patent Number: 4,947,983
[45] Date of Patent: Aug. 14, 1990

[54] DISTILLING APPARATUS

[76] Inventor: Walter Jost, Quittenweb 17, 7300 Esslingen, Fed. Rep. of Germany

[21] Appl. No.: 357,327

[22] Filed: May 25, 1989

[30] Foreign Application Priority Data

Jun. 3, 1988 [DE] Fed. Rep. of Germany ....... 3818844

[51] Int. Cl.⁵ .................... B01D 1/02; B01D 1/06; B01D 3/04
[52] U.S. Cl. .................... 202/163; 122/412; 122/13.1; 134/105; 134/109; 159/27.4; 159/28.4; 159/29; 159/43.1; 202/237; 202/254; 202/261; 202/262; 203/100
[58] Field of Search ............ 202/170, 163, 164, 185.6, 202/237, 254, 261, 262; 203/100; 159/28.4, 27.4, 28.4, 29, 43.1; 134/12, 105, 109; 122/13 R, 412

[56] References Cited

U.S. PATENT DOCUMENTS

| 1,635,112 | 6/1925 | Carlson et al. | 202/163 |
| 2,490,659 | 12/1949 | Snyder | 202/174 |
| 3,915,808 | 10/1975 | Wilcox | 202/169 |
| 4,040,898 | 8/1977 | Englander et al. | 159/27.1 |
| 4,251,361 | 2/1981 | Grimsley | 210/170 |
| 4,341,599 | 7/1982 | Watson et al. | 202/176 |
| 4,581,133 | 4/1986 | Tomes | 202/185.6 |
| 4,663,037 | 5/1987 | Breslin | 210/170 |

FOREIGN PATENT DOCUMENTS

| 0128071 | 12/1984 | European Pat. Off. | 202/163 |
| 3714906 | 12/1987 | Fed. Rep. of Germany . | |
| 62-42702 | 2/1987 | Japan . | |
| 98079 | 3/1923 | Switzerland . | |
| 886189 | 1/1962 | United Kingdom . | |
| 1158696 | 7/1969 | United Kingdom . | |

Primary Examiner—Virginia Manoharan
Attorney, Agent, or Firm—Flynn, Thiel, Boutell & Tanis

[57]         ABSTRACT

A distillation apparatus includes a heating device, an inlet for medium to be distilled, a vapor outlet, a distillation space between the distillation medium inlet and the vapor outlet and a drain for the separate components of the solvent, arranged in the bottom part of the distilling space and extending from same. In a heating vessel, which is able to be filled with a heating medium to be heated by the heating device, there is a downwardly extending down tube joined with the inlet and an up tube extending upwards to the vapor inlet. During operation the two tubes are surrounded by heating medium and form the distillation space. The drain is arranged under the junction between the up and down tubes and is provided with a U-trap.

12 Claims, 2 Drawing Sheets

DISTILLING APPARATUS

BACKGROUND OF THE INVENTION

The invention relates to a distilling apparatus, more particularly for distilling spent solvent in a dry cleaning plant for the solvent cleaning of articles such as garments, comprising a heating device, an inlet for medium to be distilled, a vapor outlet, a distilling space between the inlet for the medium to be distilled and the vapor outlet and a drain arranged in the bottom part of the distilling space and extending from it for the separated components.

The distilling apparatus is thus more particularly conceived for chemical, liquid solvents, which are utilized in the plant for dry cleaning. In the case of such a cleaning apparatus the dirt on the articles is dissolved in the solvent so that the latter becomes contaminated in the course of time with oil, fatty acids and the like. Such contaminants may be separated by process of distillation.

Distillation apparatus is also used for cleaning other liquids besides solvents, as for instance for preparing distilled water.

Such a still with the above specified features is described in the German unexamined patent specification 3,714,906.

In the still in accordance with this said specification 3,714,906 there are a number of vertical lengths of tube, which are arranged in the bottom part of the distilling space and each contain a heating electrode. The medium to be distilled is supplied to the lengths of tube via an inlet therefor at the bottom of the still so that the medium to be distilled flows through the tubes and is heated by the heating electrodes. The vapor emerging from the tubes is then deflected a number of times and arrives at the vapor outlet. The high boiling point fraction remains in the tubes and may be removed therefrom via a drain at the bottom.

This still suffers from various disadvantages.

The heating electrodes dip directly into the medium to be distilled so that the latter is heated around the respective electrodes to a substantially greater extent than at parts remote therefrom. In order to produce a heating effect so that the temperature which is at every point in excess of the evaporation point, the heating electrodes have therefore to be operated to produce an unnecessarily high heating effect, this is not only giving rise to increased operating costs but furthermore leading to local overheating of the medium to be distilled so that the latter may decompose if it is for instance in the form of a solvent.

Furthermore overheating leads to the formation of foam so that it will not only be vapor but also foam which emerges at the tubes. This is certainly also the reason for the adjoining vapor path having bends and further drain points. In this respect the upward motion and the emergence of the foam is favored by the use of a pump to supply the medium to be distilled and which forces it upwards. Owing to the flow path extending in an upward direction in the tubes it is not possible to dispense with this application of pressure.

Furthermore the still is a comparatively complicated piece of apparatus requiring much space since the local and direct heating of the medium to be distilled leads to the necessity of having a plurality of tubes, which each have to be provided with a heating electrode and the various ports. Added to this, there is provision of extra complexity and space requirement due to the path of the medium having to be changed, i.e. the flow path having to be deflected, a number of times.

A further substantial defect is that during the distillation phase the drain from the tubes has to be shut off. If this were not the case, the medium to be distilled would immediately escape from the still after entering the tubes, that is to say, there would be no distillation. The result is thus intermittent operation so that there are idle times in which the separated materials are let off. Intermittent operation furthermore means that the separated components may collect in the lower parts of the tubes and form solid deposits.

SHORT SUMMARY OF THE PRESENT INVENTION

Taking this state of the art as a starting point one object of the present invention is to provide a still of the initially mentioned type which avoids overheating.

A further aim of the invention is to avoid the upward motion of foam.

Another aim of the invention is to make do with a minimum heating effect.

As a still further object the invention is to make the still capable of continuous operation if this should be desired.

The complexity of the still as a piece of apparatus and its space requirement are to be as low as possible.

In order to achieve these or other objects appearing from the present specification, claims and drawings, the still comprises a heating vessel able to be filled with a heating medium to be heated by the heating means and containing a down tube connected with the inlet for the medium to be distilled and an up tube running to the vapor outlet, such tubes being surrounded by heating medium during operation and being connected in their lower parts with each other and forming the distillation space, and the drain is arranged under the point of connection of the down and up tubes and comprises a U-trap.

In the case of the still in accordance with the invention the medium to be distilled is thus not heated from the inside but the heating medium surround the down and up tubes so that there is an even distribution of heat without local overheating such as would decompose fractions of the liquid. The heating effect required is correspondingly low and the desired evaporation temperature may be exactly set in practice. Furthermore the medium to be distilled is not put under pressure, since it flows downwards under its own weight in the down tube. In this respect the process of distillation will take place even while downward flow is taking place in the down tube so that when it reaches the point at which the down tube merges with the up one, the contaminating matter will have been substantially completely removed. The vapor of the purified liquid then moves upwards in the up tube while the separated matter will pass of its own accord to the drain which is placed under the connection point between them. Thus the formation of foam is precluded and furthermore continuous operation is made possible. In this respect the U-trap of the drain is important which allows the passage of the separated liquid components while at the same time holding back vapor. Thus the still may be operated so that the liquid components are continuously drained off and it is not possible for any deposits to be left in the distilling space which would form a solid layer adhering to the wall of the apparatus.

In the still in accordance with the invention the medium to be distilled, the vapor coming over and the separated components are continuously on the move so that the above noted advantages result.

With the aid of the U-trap at the drain it is possible to achieve the further advantage that the collecting container, into which the separated components flow, may be sealed off from the outside in order to prevent smells. The air displaced by the entry of the liquid components into the collecting container passes via the U-trap into the distilling space and is removed from the latter together with the vapor.

Since the up tube is located inside the heating medium, and is thus also evenly heated, premature cooling of the vapor is not possible. Any liquid droplets still present in the upwardly moving vapor fall downwards.

Since the distillation does not take place while the medium to be distilled is stationary the amount of space required is small. Furthermore the apparatus is simple since it is made up of a comparatively small number of parts.

In order to accommodate a great length of down tube in the least possible amount of space, the down tube may be conveniently be helical in shape. In this manner it is possible to ensure that the liquid will have been converted into vapor by the time the connection point with the up tube is reached. A particularly compact arrangement is possible if the down tube is at least partly coiled around the up tube.

If the up tube has a larger diameter than the down one, then the removal of vapor becomes particularly simple.

Preferably the drain tube has a discharge valve, which may be shut, so that the drain may be shut off in case of need.

It is preferred for the down tube to open into the up tube at a point above the lower end of the up tube.

In accordance with a further convenient feature of the invention the up tube has an extension beyond the heating vessel so that during operation in unfavorable conditions any residual contaminant still present in the vapor may not move any further and fall back in a downward direction.

As regards running costs it is particularly convenient if oil or other heating storing media are used as the heating medium. It is then an advantage to operate so that the heating process is intermittent and is performed under the control of a thermostat.

If the heating device is immersed in the heating medium there is a particularly satisfactory transmission of heat.

It is also an advantage if the up tube arranged outside the heating vessel has a lateral bend. This also may serve to "shake off" any droplets still present in the vapor which are not able to follow the bend.

A further possible feature of the invention is for down tube to be fed from a U-trap, this being a simple way of precluding back flow of vapor.

Further advantages of the invention will be gathered from the ensuing account of based on the accompanying drawings.

DETAILED ACCOUNT OF WORKING EXAMPLES OF THE INVENTION

Both the preferred embodiments of the still in accordance with the invention are more particularly suitable for dry cleaning plant. Since however such still find other applications, the drawings do not include any details of such a cleaning plant. Nevertheless, the ensuing account is generally to be centered on use in a such cleaning plant.

Such drying cleaning plant regularly has a rotating cleaning drum, which comprises the articles to be cleaned and in which a dirt-dissolving solvent is place. After leaving the drum the solvent may be passed through a dirt filter, which filters off solid contaminants. However soluble contaminants such as oil and fatty acid do accumulate in the solvent during the course of time so that the cleaning properties of the solvent are impaired. In order to remove such contaminants the liquid mixture is from time to time or continuously passed through the still in accordance with the invention.

In both the figures arrows 1 indicate how the liquid to be distilled, which in what follows is referred to as the solvent (i.e. the medium to be distilled) is introduced into the still 2 or, respectively, 2'. The respective solvent inlet is indicated at 3. As the solvent passes through the still 2 or, respectively, 2' the process of distillation then takes place, in which the solvent is converted into the vapor phase, in which it leaves the still as indicated by the arrows 4 in order to flow into a condenser which is not shown in detail so that it may be condensed as cleaned solvent. The solvent is then able to be used in the dry cleaning process again.

Figure 1:
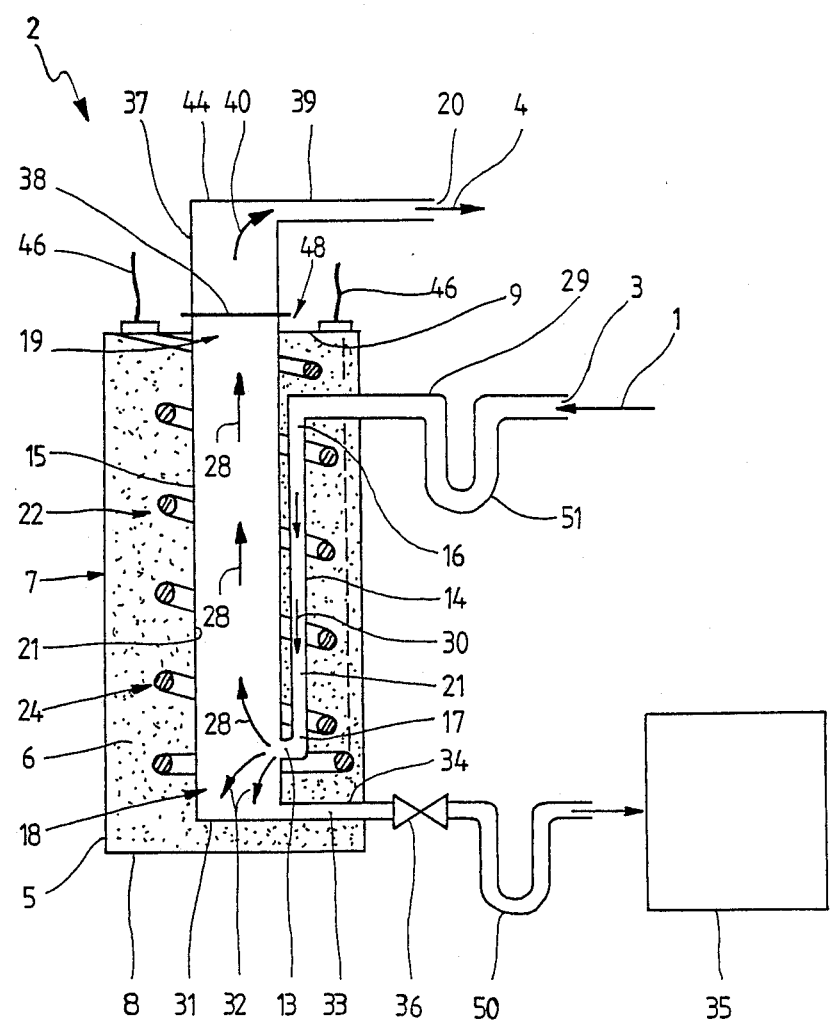
FIG. 1 is a highly diagrammatic longitudinal section of a first form of the still in accordance with the invention whose preferred application is in solvent cleaning plant such as a dry cleaning installation.
Figure 2:
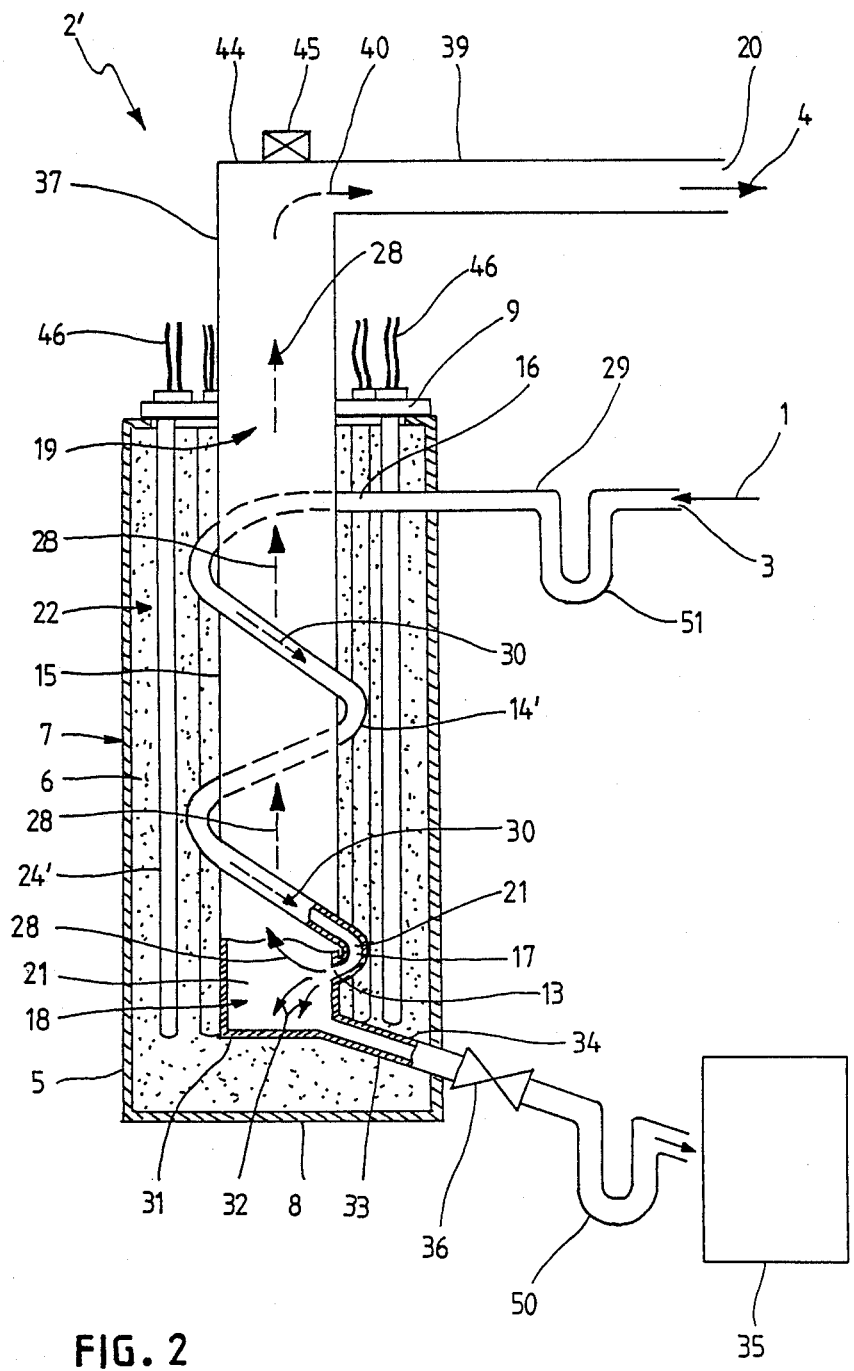
FIG. 2 is a further diagrammatic longitudinal section taken through a further form of the still in accordance with the invention, whose preferred application is again in a dry cleaning plant, with an optimized course of the down tube.

The stills in accordance with FIGS. 1 and 2 each have a heating vessel 5 closed on all sides so a as define an internal heating space 6. A heating vessel in the form of a hollow cylinder with a wall 7 has been found to be particularly suitable. The heating vessel 5 of the working example is in the form of a pot and has an integral bottom 8 at its lower end, while the upper end is shut off by a removable sealing cover 9.

In the interior of the heating space 6, which in the working example is in the form of a cylinder, there are two communicating tubes, that is to say the down tube 14 and 14' in FIGS. 1 and 2, respectively, the up tube 15. In the condition of use illustrated of the still of FIGS. 1 and 2 the down tube 14 and, respectively, 14' is arranged to extend from the top towards the bottom, its upper end part 16 corresponding with the solvent inlet 3, while the lower tube end 17 opens at connection 13 leading into the lower tube part 18 of the up tube 15. The up tube 15 is arranged to run from the bottom towards the top, its upper tube part 19 being in communication with a vapor outlet 20, through which the vapor flows off as indicated by the arrow 4.

Both the down tube 14 and, respectively, 14' and furthermore the up tube 15 are located in the interior of the heating space 6 and the two tubes occupy a single distilling space 21 in the interior.

The heating space 6 is furthermore preferably completely filled with a liquid heating medium 22 which is denoted by dotting in the figures. The liquid is preferably a heat storage medium such as oil. This heating medium 22 surrounds the two tubes 14 and, respectively, 14' and 15. The heating medium 22 is able to be heated by a heating device 24 and 24' with at least one heating element. It is in this manner that it is possible to ensure an even transmission of heat from the heating medium heated by the heating elements to the distilling space and, respectively, the liquid located therein. This even transmission of heat offers the advantage that a substantially lower heating effect is needed in order to heat the solvent to the necessary vaporization temperature. Furthermore there is no possibility of local overheating, i.e. of hot spots, in the solvent so that it is possible to ensure an even, controlled heating action and there is no possibility of any decomposition of the feed solvent due to excessive temperatures.

The preferred course of the process in the still in accordance with the invention takes place as follows.

The spent solvent bearing contaminants is supplied as indicated by the arrow 1 through the inlet 3 and passes via a tube 29 with a greater or lesser length into the upper part of the respective down tube 14 and 14', whence the solvent flows as indicated by the arrows 30 in the down tube 14 and 14' in a downward direction to be exposed to the evenly acting thermal energy from the heating medium 22. At the latest in the junction 13, that is to say at the point where the downtube opens into the lower part 18 of the up tube 15, the solvent will have reached its vaporization temperature. It thus rises in the interior of the up tube 15 as indicated by the arrows 28 in the form of vapor upwards towards the upper tube part 19. The heavier, higher boiling liquid impurities on the other hand do not rise and remain below, where in the working examples, in which the lower tube port 31 of the up tube 15 is lower down than the connection point 13 or junction, they move downwards as indicated by the arrows 32 and are deposited here. While the vapor-phase solvent freed of contaminants flows as indicated by the arrow 4 to a condenser for example, the liquid contaminants, which collect in the lower part 18 of the up tube 15, may drain off via a drain 33. In the working examples the drain 33 is in the form of a length 34 of tube, which extends from a point, preferably lower down than the junction 13, in the lower part of the up tube 15 to a point where it extends in a sealed manner through the wall of the heating vessel 5 to the outside to be preferably connected with a sealed collecting container 35. In the present working examples of the invention the drain 33 may have a drain valve 36 in it so that emptying may take place at intervals. This involves the advantage that during draining a suction effect is produced, which also entrains any lumpy matter and there is a self-cleaning effect.

In both the working examples the up tube 15 arranged in the interior of the heating space 6 has a linear form and in the working state extends vertically. The same applies for the down tube 14 used in the working example of the invention as shown in FIG. 1, this tube extending outwards in the upper and lower parts so that on the one hand it extends out of the heating vessel and on the other hand it extends to the junction 13. Between these points the down tube 14 runs parallel and close to the up tube 15 so that in the direction perpendicular to the flow directions 28 and 30 the dimensions are small.

On the other hand in the working example of the invention shown in FIG. 2 the down tube 14' has a helically coiled configuration coaxially surrounding the up tube 15 as a core. There is thus a helical design. The advantage in this respect is that the breadth of the still may be further reduced and that it is possible for the down tube 14' to be made substantially longer between the upper end part 16 and the junction 13, this leading to a longer heating time during flow through the tube.

The two examples of the invention have the feature in common that the diameter of the up tube 15 exceeds that of the down tube 14 and, respectively, 14'. The two tubes 14 and, respectively, 14' and 15 made be made integral with each other. The material of the tube may be refractory glass or metal.

As will be seen from the figures it is possible for the lower end 31 of the up tube 15 to be arranged at a lower level than the junction 13 at which the down tube 14 and, rspectively, 14' opens from the side into the up tube 15. The result is then a collecting space for separated contaminants in the lower part 18 of the up tube.

The up tube 15 is preferably arranged to extend coaxially in relation to the heating vessel 5. It furthermore has an extension 37 which at the top near the cover 9 extends out of the heating vessel 5. This extension 37 of the up tube 15 is accordingly arranged between the vapor outlet 20 and the up tube 15 in the restricted meaning. Preferably the extension 37 is made integrally with the up tube 15, as is shown in FIG. 2. A design in which it is a separate component (FIG. 1) is possible, in which case the extension 37 may be detachably connected with the up tube 15 via a flange 38.

The extension 37 and the associated up tube 15 are best arranged coaxially in relation to each other so that the up tube is prolonged in a vertical direction. The prolongation 37 of the up tube means that there is a longer flow path for the vapors as indicated by the arrows 28 so that in unfavorable conditions any entrained contaminants drop back at the latest in the prolongation 37 and pass downwards into the lower part 18 of the up tube.

It is preferred for the vapor rising as indicated by the arrows 28 to be deflected to the side outside the heating vessel 5 so as to depart from the original direction of upward motion. In the working examples for this purpose the prolongation 37 of the up tube is joined with a transverse tube 39 forming the diversion or bend and this tube 39 is aligned with the up tube 15 on the other hand and on the other hand with the vapor outlet 20.

The ascending vapor is thus laterally deflected in the opening of the transverse tube 39 as indicated by the arrow 40 so that liquid components are not able to follow such deflection motion and impinge on the axial upper termination 44 of the prolongation 37 and then fall downwards. In the vicinity of the upper termination 44 it is possible to provide a safety valve 45.

It is preferred to provide at least one heating element of the heating device 24 and 24' in the interior of the heating space 6 so as to be immersed directly in the heating medium. This ensures an optimum transmission of heat and the highest possible heating rate.

It is moreover an advantage if the heating element or elements laterally surround the distilling space 21 and, respectively, the tubes 14 and 14' delimiting it, the two tubes preferably being surrounded by the heating element arrangement along the full length thereof. In the working example of FIG. 1 there is a single heating element 24 which is helically formed in the form of a heating coil and has its coils placed so as to surround the two tubes 14 and 15. There are electric terminals at 46.

However the use of a plurality of heating elements 24', more especially in the form of rods is possible, as is the case in the working embodiment of FIG. 2. They extend in the annular space between the array formed by the tubes 14 and 15 and the wall 7 of the heating vessel 5 so that they are preferaly regularly distributed in the peripheral arranged with reference to the longitudinal axis of the up tube 15 and extend in the longitudinal direction of the up tube 15. Here there are also electric terminals 46 for the heating power, such terminals 46 again being arranged on the cover 9 if desired. The cover 9 is detachably connected with the heating vessel 5 in a sealing manner. The cover simultaneously serves as a support for the heating elements 24 and 24', which may thus be removed by taking off the cover 9. Furthermore the cover 9 in the working embodiment of FIG. 1 has central opening 48 for the insertion of the up tube 15, while in the working example of FIG. 2 it is molded on the up tube 15. This feature means that the overall arrangement may be practically fitted in a single operation.

It is convenient if the inlet part and outlet part of the two tubes 14 and, respectively, 14' and 15 as looked at in relation to the heating vessel are arranged generally at the same height.

In both the working embodiments the tubes and the heating elements are preferably arranged so as to depend into the heating space 6 and there is little chance of contact with the wall or bottom parts.

The respective down tube 14 and 14' may be placed without making contact alongside the up tube 15 or surround the same. This means that there is a space, which is filled with heating medium 22, between the respective down tube 14 and 14' and the associated up tube 15, this being a particular advantage for even transmission of heat. The two tubes may be completely immersed in heating medium without individual area sections being left uncovered.

With respect to the prolongation 37 of the up tube it is to be additionally noted that it is best made so that it is thermally insulated. It will be clear that the heating vessel 5 is also able to be insulated.

In both designs a U-trap 50 is arranged at the drain 33. This U-trap 50 may take the place of the drain valve 36. The presence of the U-trap 50 means that contaminants in the form of vapor are continuously able to discharge without solvent vapor being lost.

It is furthermore possible for the inlet 3 to be provided with a U-trap 51 which prevents back flow of the vapor.

Both the U-trap 50 and also the U-trap 51 thus constitute shut off means.

With reference to the heating device it is also to be noted that other forms of heating devices may be used in certain cases in place of the one described. Microwave heating systems may be of advantage. It is also possible for the down tube and/or the up tube to be used itself as a heating element, for instance by applying electrical power between its respective ends.

Lastly it is to be noted that the term tube as used herein means not only tubes as the word is used commercially but also any means fulfilling the purpose of a tube such as a vessel, container or the like which defines a lumen. However it is an advantage if the tubes in the invention are in the form of circularly cylindrical tubular members.

I claim:

1. A still, comprising: a heating device, means defining an inlet for medium to be distilled, means defining an outlet for vapor, means defining a distillation space between the inlet and the vapor outlet, means defining a drain extending from a bottom part of the distillation space for components separated from the medium, and a heating vessel holding a heating medium so that same is heated by said heating device; wherein said means defining said distillation space includes a down tube extending downwards in the heating vessel and connected at a top end thereof with said inlet, an up tube extending upwards towards the vapor outlet, and means defining a connection for providing fluid communication between said up tube and said down tube at locations below said vapor outlet and said inlet, respectively; said up and down tubes being arranged in said heating vessel to be surrounded by said heating medium, and said drain including a U-trap below said connection between the down tube and the up tube.

2. The still as claimed in claim 1 wherein the down tube has a helical form.

3. The still as claimed in claim 1 wherein the drain comprises a discharge valve which is able to be shut off.

4. The still as claimed in claim 1 wherein the up tube comprises a prolongation extending past the heating vessel in an upward direction.

5. The still as claimed in claim 1 wherein the heating medium is oil.

6. The still as claimed in claim 1 wherein the heating device is immersed in the heating medium.

7. The still as claimed in claim 6, wherein said heating device has a substantially helical configuration and is coiled around said up tube.

8. A still, comprising: a heating device; means defining an inlet for medium to be distilled; means defining an outlet for vapor; means defining a distillation space between the inlet and the vapor outlet; means defining a drain extending from a bottom part of the distillation space for components separated from the medium; a heating vessel holding a heating medium so that same is heated by said heating device; a down tube extending downwards in the heating vessel and connected at a top end thereof with said inlet; and an up tube extending upwards towards the vapor outlet; said up and down tubes being arranged to be surrounded by said heating medium, and said drain including a U-trap below a point of connection between the down tube with the up tube; wherein the down tube has a helical form; and wherein the down tube is arranged to be at least partly coiled around the up tube.

9. A still, comprising: a heating device; means defining an inlet for medium to be distilled; means defining an outlet for vapor; means defining a distillation space between the inlet and the vapor outlet; means defining a drain extending from a bottom part of the distillation space for components separated from the medium; a heating vessel holding a heating medium so that same is heated by said heating device; a down tube extending downwards in the heating vessel and connected at a top end thereof with said inlet; and an up tube extending upwards towards the vapor outlet; said up and down tubes being arranged to be surrounded by said heating medium, and said drain including a U-trap below a point of connection between the down tube with the up tube; wherein the up tube has a larger diameter than the down tube.

10. A still, comprising: a heating device; means defining an inlet for medium to be distilled; means defining an outlet for vapor; means defining a distillation space between the inlet and the vapor outlet; means defining a drain extending from a bottom part of the distillation space for components separated from the medium; a heating vessel holding a heating medium so that same is heated by said heating device; a down tube extending downwards in the heating vessel and connected at a top end thereof with said inlet; and an up tube extending upwards towards the vapor outlet; said up and down tubes being arranged to be surrounded by said heating medium, and said drain including a U-trap below a point of connection between the down tube with the up tube; wherein the down tube opens laterally into the up tube above the lower termination of the up tube.

11. A still, comprising: a heating device; means defining an inlet for medium to be distilled; means defining an outlet for vapor; means defining a distillation space between the inlet and the vapor outlet; means defining a drain extending from a bottom part of the distillation space for components separated from the medium; a heating vessel holding a heating medium so that same is heated by said heating device; a down tube extending downwards in the heating vessel and connected at a top end thereof with said inlet; and an up tube extending upwards towards the vapor outlet; said up and down tubes being arranged to be surrounded by said heating medium, and said drain including a U-trap below a point of connection between the down tube with the up tube; and including means for causing lateral deflection of a flow from the up tube at a point outside the heating vessel.

12. A still, comprising: a heating device; means defining an inlet for medium to be distilled; means defining an outlet for vapor; means defining a distillation space between the inlet and the vapor outlet; means defining a drain extending from a bottom part of the distillation space for components separated from the medium; a heating vessel holding a heating medium so that same is heated by said heating device; a down tube extending downwards in the heating vessel and connected at a top end thereof with said inlet; and an up tube extending upwards towards the vapor outlet; said up and down tubes being arranged to be surrounded by said heating medium, and said drain including a U-trap below a point of connection between the down tube with the up tube; wherein said inlet includes an inlet U-trap.

* * * * *